United States Patent
Kim et al.

(10) Patent No.: US 11,481,655 B2
(45) Date of Patent: Oct. 25, 2022

(54) SYSTEM AND METHOD OF HYPERCONNECTED AND DISTRIBUTED PROCESSING FOR INTELLIGENT INFORMATION

(71) Applicant: ELECTRONICS AND TELECOMMUNICATIONS RESEARCH INSTITUTE, Daejeon (KR)

(72) Inventors: Sang Ki Kim, Daejeon (KR); Sun Me Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 343 days.

(21) Appl. No.: 16/698,592

(22) Filed: Nov. 27, 2019

(65) Prior Publication Data
US 2020/0167676 A1    May 28, 2020

(30) Foreign Application Priority Data
Nov. 27, 2018  (KR) .................. 10-2018-0148826

(51) Int. Cl.
  G06E 1/00      (2006.01)
  G06N 5/04      (2006.01)
  H04L 67/10     (2022.01)
  G06N 20/00     (2019.01)
(52) U.S. Cl.
  CPC ............. *G06N 5/043* (2013.01); *H04L 67/10* (2013.01); *G06N 20/00* (2019.01)

(58) Field of Classification Search
  CPC .............................. G06N 5/043; H04L 67/10
  See application file for complete search history.

(56) References Cited

U.S. PATENT DOCUMENTS

| | | | |
|---|---|---|---|
| 9,888,435 B2 | 2/2018 | Chang et al. | |
| 10,318,703 B2* | 6/2019 | Hunsaker | .......... G06Q 30/0621 |
| 10,742,313 B1* | 8/2020 | Favarolo | .......... H04B 7/18578 |
| 2018/0027555 A1 | 1/2018 | Kim et al. | |

FOREIGN PATENT DOCUMENTS

| | | |
|---|---|---|
| KR | 10-1773593 B1 | 8/2017 |
| KR | 10-1787448 B1 | 10/2017 |

OTHER PUBLICATIONS

"An Introduction to Brain Networks", Fundamentals of Brain Network Analysis, pp. 1-35, 2016.

* cited by examiner

*Primary Examiner* — Hua Fan
(74) *Attorney, Agent, or Firm* — Rabin & Berdo, P.C.

(57) ABSTRACT

This present invention relates to a system for processing distributed intelligent information, and discloses a method that when there are no actions beyond the threshold value among the analyzed actions, a virtual global workspace (GW) is formed, the global workspace including one or more thinking devices, and the thinking device operates as a first type device or a second type device, in which an action alternative is requested for the global workspace in the case of operating as the first type device, and an action solution is proposed for the global workspace in the case of operating as the second type device.

20 Claims, 12 Drawing Sheets

SYSTEM AND METHOD OF HYPERCONNECTED AND DISTRIBUTED PROCESSING FOR INTELLIGENT INFORMATION

CROSS REFERENCE TO RELATED APPLICATION

The present application claims priority to Korean Patent Application No. 10-2018-0148826, filed Nov. 27, 2018, the entire contents of which is incorporated herein for all purposes by this reference.

BACKGROUND OF THE INVENTION

Field of the Invention

The present invention relates to a system and method of distributed processing for intelligent information, which mimics the function and network structure of the brain in order to efficiently perform local and rapid intelligence processing in parallel as well as global and exploratory intelligence processing through cooperation and competition between local intelligences, in a large-scale, hyperconnected IoT environment, such as a future smart city, in which various sensors and autonomous cars/drones/robots collect and process a variety of data.

Description of the Related Art

Recently, as research on the structure and function of the brain has progressed, artificial intelligence research that mimics the brain brings better results. Artificial neural networks have been created on the basis of mathematical models of the brain, and have recently evolved into deep learning. However, most of these machine learning and inference methods have centralized model that concentrates data in places such as large cloud centers, or makes an inference using derived models at device.

This includes many problems such as network latency, network bandwidth consumption, data privacy, and restrictions in information sharing between domains due to silo structure. As a result, there is a tendency to move intelligence processing in the cloud into fog computing or edge computing environments, and even an in-network processing environment. However, when applying the existing centralized intelligence processing methods to these distributed computing environments directly without change, it is impossible to solve the existing problems or provide the benefits of the distributed architecture.

The present invention proposes a hyperconnected distributed intelligent service method in such a hyperconnected and distributed computing environment, which mimics the information processing structure of the brain composed of numerous neurons and synapses in such a hyperconnected distributed computing environment.

SUMMARY OF THE INVENTION

Accordingly, the present invention has been made keeping in mind the above problems occurring in the prior art, and an objective of the present invention is to provide local automatic cognitive method for learning and problem solving with local data and experience knowledge in a distributed computing environment and a global problem-solving structure and methodology with the help of specialist agents in other domains with different knowledge and cognitive functions, when encountering new problems that cannot be solved with existing knowledge and local automatic cognitive methods for learning and problem solving with local data and experience knowledge in a distributed computing environment.

Technical problems to be achieved in the present invention are not limited to the above-mentioned technical problems, and other technical problems not mentioned above will be clearly understood by those skilled in the art from the following description.

According to the present invention, a distributed processing system for intelligent information and a method of intelligently processing information using distributed thinking devices may be provided.

The distributed processing system for intelligent information may include a thinking device which derives actions on the basis of an input signal, analyzes the actions, selects one action when there are multiple actions beyond a threshold value among the analyzed actions, and transmits a signal for the selected action; a sensor device located in a real external environment and transmitting sensing data to the thinking device; and an actuator receiving the signal for the selected action from the thinking device and making an action on the basis of the receiving signals.

Herein, when there is no action beyond the threshold value among the analyzed actions, a virtualized global workspace (GW) including one or more node devices may be formed. The global workspace including one or more thinking devices, and the thinking device may operate as a first type device or a second type device, in which an action alternative is requested for the global workspace in the case of operating as the first type device, and an action solution is proposed for the global workspace in the case of operating as the second type device.

According to an embodiment of the present invention, the global workspace may be composed of an artificial association cortex portion included in the thinking devices, which mimics a function of an association cortex of human brain, and the association cortex portion, an intelligent agent, may construct a multi agent system environment.

According to an embodiment of the present invention, when the thinking device operates as the first thinking device, the first thinking device may request the action alternatives beyond the threshold value to the global workspace, and when the thinking device operates as the second type device, one or more second type devices included in the global workspace may propose the action solution beyond the threshold value on the global workspace.

According to an embodiment of the present invention, the thinking device may further include a basal ganglia portion; when the association cortex portion of the first type device may request the action alternative beyond the threshold value to the global workspace, the basal ganglia portion may determine whether there are actions beyond the threshold value among the analyzed actions; and when there are no actions beyond the threshold value among the analyzed actions, the association cortex portion may transmit an action alternative request signal for deriving actions beyond the threshold value to the global workspace.

According to an embodiment of the present invention, when the thinking device operates as the second type device, the input signal may correspond to the action alternative request signal of the first type device received by the association cortex portion of the second type device.

According to an embodiment of the present invention, the second type device may receive the action alternative request signal of the first type device, derive actions on the basis of the action alternative request signal, analyze the actions, and select one of the actions beyond the threshold value as the action solution when there are actions beyond the threshold value among the analyzed actions, and the association cortex portion transmits a signal for the action solution to the global workspace.

According to an embodiment of the present invention, the thinking device may further include a sensory cortex portion; and when the thinking device operates as the first type device, the input signal may correspond to a signal obtained by receiving sensing data from the sensor device and pre-processing the sensing data.

According to an embodiment of the present invention, the thinking device may further include a basal ganglia portion, and sets priorities of the actions when the basal ganglia portion analyzes the actions.

According to an embodiment of the present invention, the basal ganglia portion may determine whether there is an action beyond the threshold value among the actions according to the priority values of the actions.

According to an embodiment of the present invention, the thinking device may further include an amygdala portion; and the amygdala portion may perform a positive or negative evaluation of the actions using information stored in the thinking device, and the basal ganglia portion may analyze the actions using evaluation results.

According to an embodiment of the present invention, the thinking device may further include an amygdala portion, and receives a signal for an operation result of the actuator and performs an evaluation thereof so that information evaluated for the operation result is stored in the thinking device as meta information related to reward.

According to an embodiment of the present invention, the association cortex portions of the thinking devices may be implemented in one device separated from the thinking devices, and the global workspace may be implemented as one physical thinking device.

According to an embodiment of the present invention, the system may use a blackboard model.

According to an embodiment of the present invention, the global workspace may have a hierarchical structure.

According to an embodiment of the present invention, the global workspace may be implemented with a publish/subscribe (Pub/Sub) mechanism.

According to the present invention, it is possible to carry out specialized and fast decisions for each field in a complex environment such as a future city where various domains and problems occur.

According to the present invention, as the experts construct a task force to solve the problem when a new complex problem arises, it is possible to provide decision-making by collective intelligence and thus provide opportunities for new knowledge sharing against existing silo style operation of a smart city.

According to the present invention, it is possible to derive the autonomous problem solving ability in a hyperconnected infrastructure on a large scale in the future, by realizing a structure capable of finding an emergence of artificial consciousness that mimics human consciousness.

According to the present invention, by providing an open structure in which various artificial intelligence technologies can be adopted by competition, it is possible to make it easy to perform advancement of the overall intelligence processing system.

The effects obtainable in the present invention are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, with reference to the accompanying drawings, an apparatus and a method in an embodiment of the present invention will be described in detail. It will be described focusing on the parts necessary to understand the operation and action according to the present invention.

Figure 1:
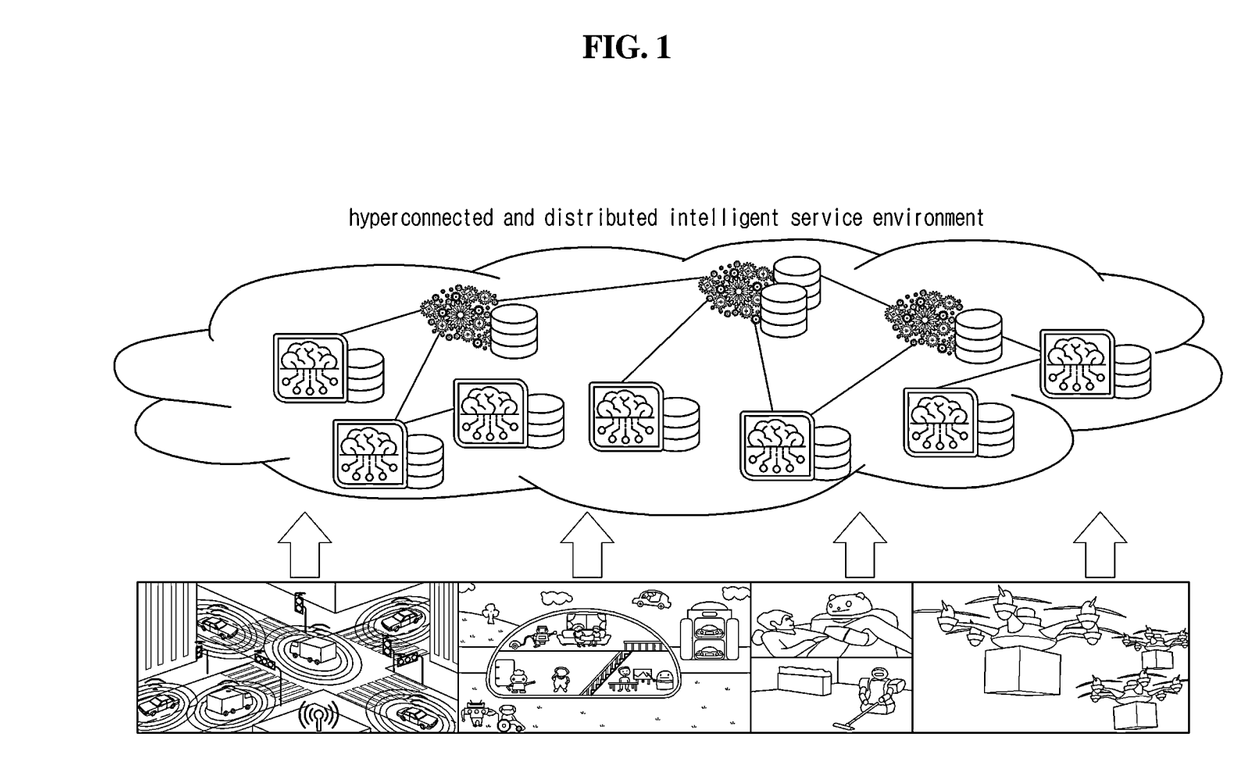
FIG. 1 is a diagram illustrating a future hyperconnected distributed intelligent service environment.

FIG. 1 is a diagram illustrating a future hyperconnected distributed intelligent service environment.

The present invention basically assumes a hyperconnected and distributed intelligent service environment as shown in FIG. 1. In future cities, numerous intelligent edge devices will interact via hyperconnected networks. In addition, energy-constrained devices will offload complex and computationally-intensive tasks to networks with fog computing node, infrastructure edge node, or in-network computation node. Many distributed or decentralized intelligent processing nodes can create new converged intelligences through cooperation and competition in the form of multi-agent system or swarm intelligence.

Figure 2:
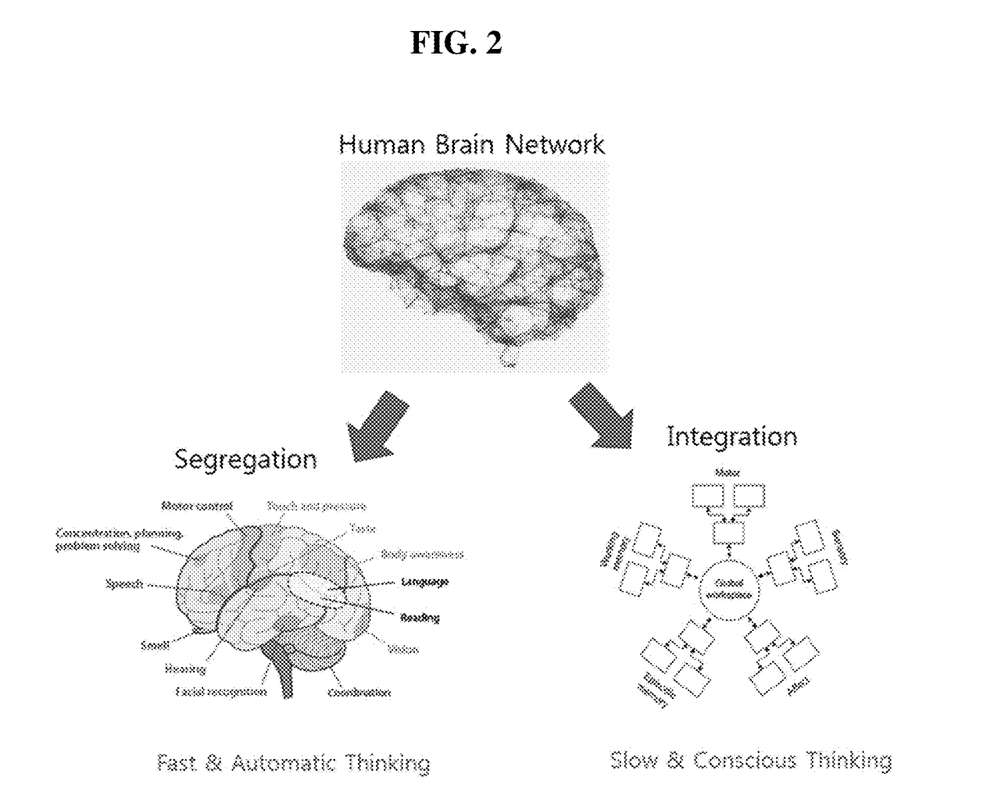
FIG. 2 is a view illustrating a cognitive function model of the human brain to be mimicked according to the present invention.

FIG. 2 is a view illustrating a cognitive function model of the human brain to be mimicked according to the present invention.

The human brain contains numerous neurons and synapses that connect neurons. The brain network has complex network features such as modularity, a small world network, a rich-club organization, and the like.

As a result, the human brain has local segregation based on modularity as well as global integration based on a rich-club organization.

The local segregation model may provide a fast, automatic, unconscious way of thinking to a limited set of tasks on the basis of existing learning experiences.

The global integration model may provide a slow but deliberate way for forecasting, planning, and solving problems that have not been experienced before.

Automatic thinking is processed in parallel in the functional areas of the brain, whereas conscious thinking involves a series of thoughts through the focus of attention. As a representative model of the global cognitive model, there is the global workspace theory (GWT) which suggests that the emergence of consciousness occurs through the global work area of the cerebral association cortex, and the present invention proposes a distributed intelligent processing model on the basis of the theory of GWT.

Figure 3:
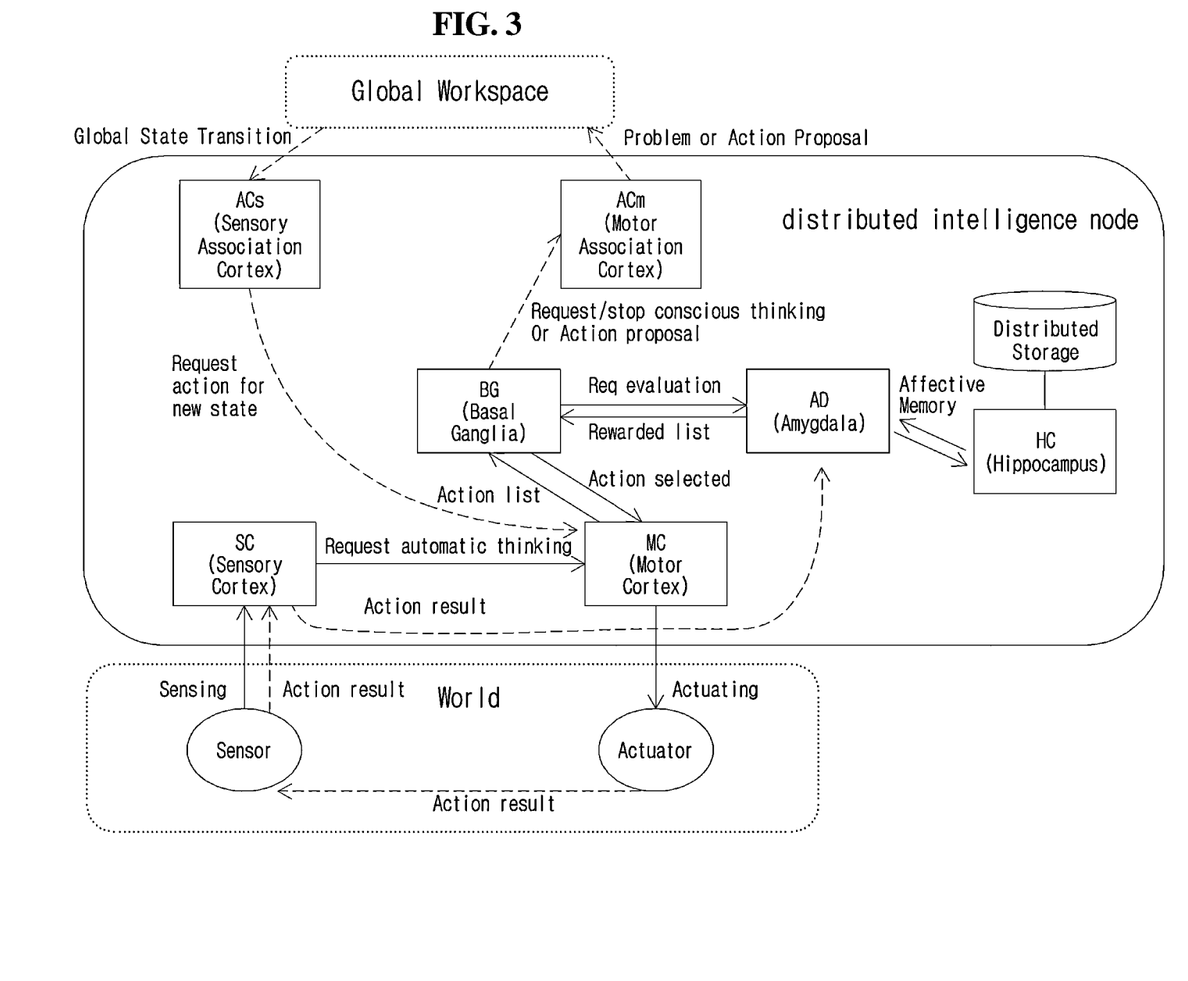
FIG. 3 is a view illustrating a configuration of distributed intelligence nodes that mimic a brain structure and external environment according to an embodiment of the present invention.

FIG. 3 is a view illustrating a configuration of distributed intelligence nodes that mimic a brain structure according to an embodiment of the present invention.

In FIG. 3, functional elements of the distributed intelligence nodes mimicking the brain that and their interactions according to the present invention are shown.

According to an embodiment of the present invention, the distributed intelligence node contains functional elements mimicking cerebral cortex, amygdala and hippocampus of the limbic system, and basal ganglia, which are the main parts of the human brain.

The cerebral cortex contains sensory cortex (SC) that receives input from sensory organs, motor cortex (MC) that issue commands to motor organs, and association cortex (AC) that combines inputs from different sensory organs and control prediction, inference, and problem-solving.

According to an embodiment of the present invention, the sensory cortex (SC) may correspond to a functional element that primarily processes sensing data input from sensor devices existing in an actual external environment.

According to an embodiment of the present invention, the motor cortex (MC) may correspond to a kind of problem-solving engine that derives the necessary actions with the sensing data through pattern matching. The motor cortex (MC) has mixed techniques different from each other. For example, AI techniques such as complex event processing (CEP), artificial neural network (ANN), and case-based reasoning (CBR) may create different solutions from each other.

According to an embodiment of the present invention, the basal ganglia (BG) may set priorities by analyzing the action lists presented by the motor cortex (MC). Herein, the basal ganglia (BG) may select the optimal alternative to return back to the motor cortex (MC). The motor cortex (MC) sends the selected action as a command to an execution device in real world.

When the basal ganglia (BG) sets priorities of the actions, the amygdala (AD) may act as a kind of reward system.

According to an embodiment of the present invention, the amygdala (AD) may perform positive/negative evaluation for each action by using pre-stored information with the help of hippocampus (HC).

In addition, the amygdala (AD) receives reports for results of the action executed in the real world from the sensory cortex (SC), performs the evaluation thereon, and reflects the evaluation results on the episode information previously learned through the hippocampus (HC) as meta information related to reward/punishment. A kind of reinforcement learning is done through those procedure.

When there are no alternatives to an action beyond the threshold in the basal ganglia (BG), that is, regarded as confronting a problem that cannot be solved by existing problem-solving methods or new complex situation that have not been experienced in the past occur, it is possible to try problem-solving using a "conscious thinking" method based on workspace theory through the association cortex (AC).

The functional elements proposed in the present invention are virtualization applications of a hyperconnected network infrastructure, and may be implemented, for example, in the form of a virtual machine (VM), a container, a unikernel, and the like.

In addition, functional elements that are virtualization applications may be mapped to physical devices in various forms. For example, each functional element may be implemented as an independent physical device, and multiple sensing cortices (SC) and motor cortices (MC) exist in one device as a cluster, and the remaining functional elements may exist one by one. Also, it is possible to create and destroy functional elements on demand.

Figure 4:
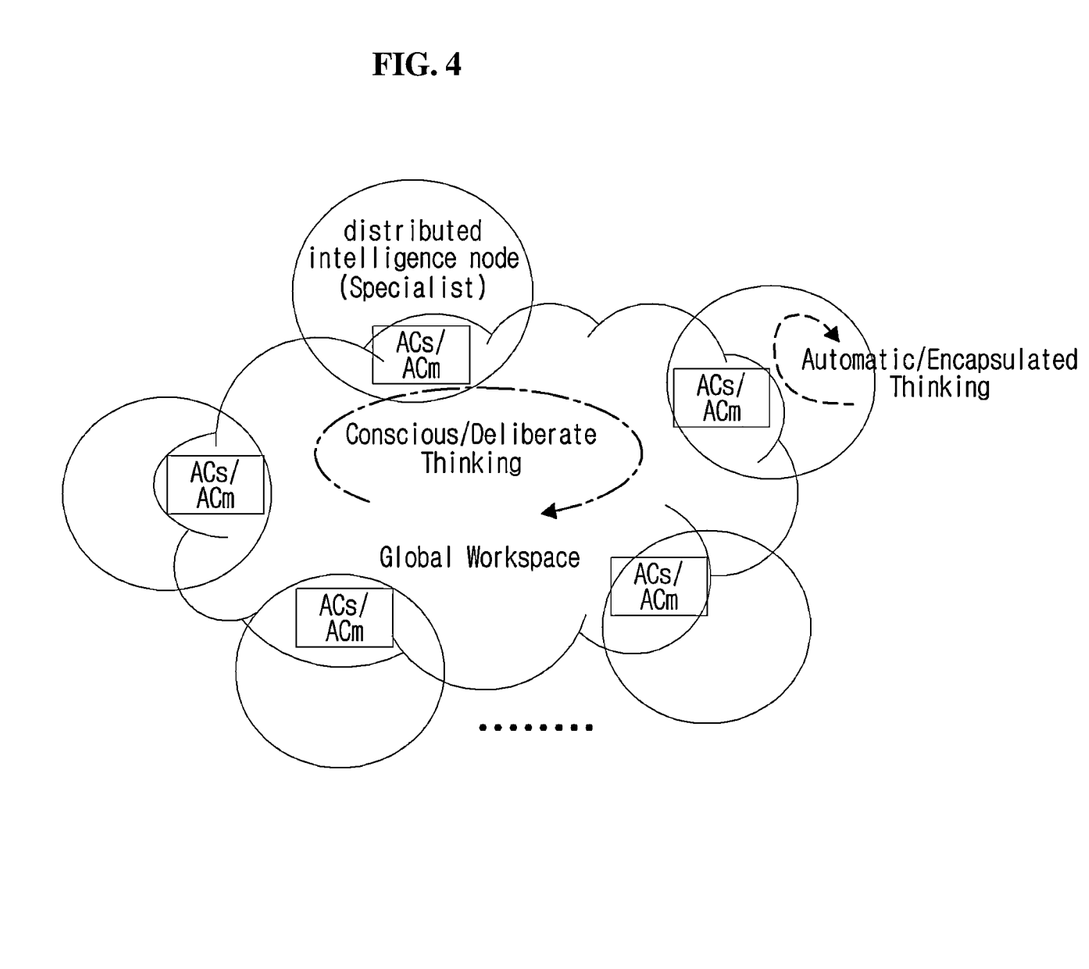
FIG. 4 is a view illustrating a virtual global workspace (GW) made up of the association cortices (AC) in distributed intelligence nodes in accordance with one embodiment of the present invention.

FIG. 4 is a view illustrating a virtual global workspace (GW) constructed as association cortices (AC) in each distributed intelligence node in accordance with one embodiment of the present invention.

The association cortices in the global workspace (GW) are intelligent agents, and may construct a multi-agent system environment.

According to an embodiment of the present invention, the mutual cooperation and competition model in the global workspace (GW) may be implemented on an existing standardization standard for agent communication language (ACL), for example, foundation for intelligent physical agents (FIPA)-ACL, knowledge query and manipulation language (KQML), or the like.

The global workspace (GW) may be realized in a Pub/Sub mechanism that have a relay broker or connect all association cortices (AC) in P2P method.

The association cortex_sensing and association cortex_motor (ACs/ACm) that constructs the global workspace (GW) are functional elements of distributed intelligence nodes, but may also be implemented by separating these functions from distributed intelligence nodes in a specific region and gathering the same in one physical node. In this case, the global workspace (GW) becomes a single physical node, and the association cortex_sensing and association cortex_motor (ACs/ACm) gathered in this node act as agents representing each distributed intelligence node. In this way, it is possible to use a blackboard model, which is a common database.

The global workspace (GW) may be organized in a hierarchical structure. The global workspace (GW) may be extended in such a manner that the global workspace (GW) is created in each region, and a global workspace (GW) of more global scale is created in an upper layer thereof.

Figure 5:
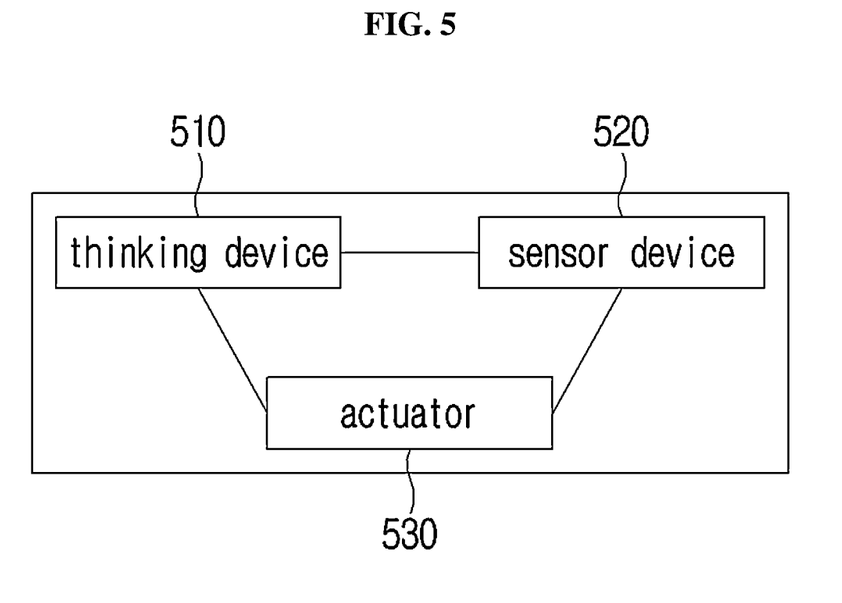
FIG. 5 is a view illustrating a configuration of a distributed intelligent information processing system according to an embodiment of the present invention.

FIG. 5 is a view illustrating a configuration of a distributed intelligent information processing system according to an embodiment of the present invention.

The distributed intelligence information processing system may include a thinking device 510, a sensor device 520, and an actuator 530.

Herein, the thinking device 510 may derive actions based on the input signal. In addition, when there are actions beyond a threshold value among the analyzed actions, the thinking device 510 may analyze the actions and select one action. Also, the thinking device 510 may transmit a signal for the selected action.

The sensor device 520 may be located in an actual external environment and transmit sensing data to the thinking device.

The actuator 530 may receive a signal for the selected action from the thinking device and operate on the basis of the signal for the action.

Herein, the thinking device 510, the sensor device 520, and the actuator 530 included in the system of the present invention may be implemented in one physical device. However, this corresponds to an embodiment of the present invention, and the thinking device 510, the sensor device 520, and the actuator 530 may be implemented in each separate device. In addition, the sensor device 520 and the actuator 530 may be located in an actual external environment, and the thinking device 510 may be separately located.

According to an embodiment of the present invention, when there is no action beyond a threshold value among the analyzed actions, a virtual global workspace (GW) may be constructed.

Herein, the threshold value may correspond to a criterion for determining the action, and may be a criterion value for determining whether the action should be derived through conscious thinking on the global workspace. The threshold value may be set by the user and may be set automatically by the system.

According to an embodiment of the present invention, one or more thinking devices may be included in the global workspace.

According to an embodiment of the present invention, the global workspace includes association cortices included in the thinking devices, and the association cortices as an intelligent agent may construct a multi-agent system environment as an intelligent agent. Herein, the artificial association cortex herein may play the same role as the human association cortex to derive the action solution according to the present invention.

According to an embodiment of the present invention, the thinking device may operate as a first type device or a second type device. Herein, when the thinking device operates as the first type device, it may play a role of requesting an action alternative for the global workspace. In addition, when the thinking device operates as the second type device, it may play a role of proposing an action solution to the global workspace.

Figure 6:
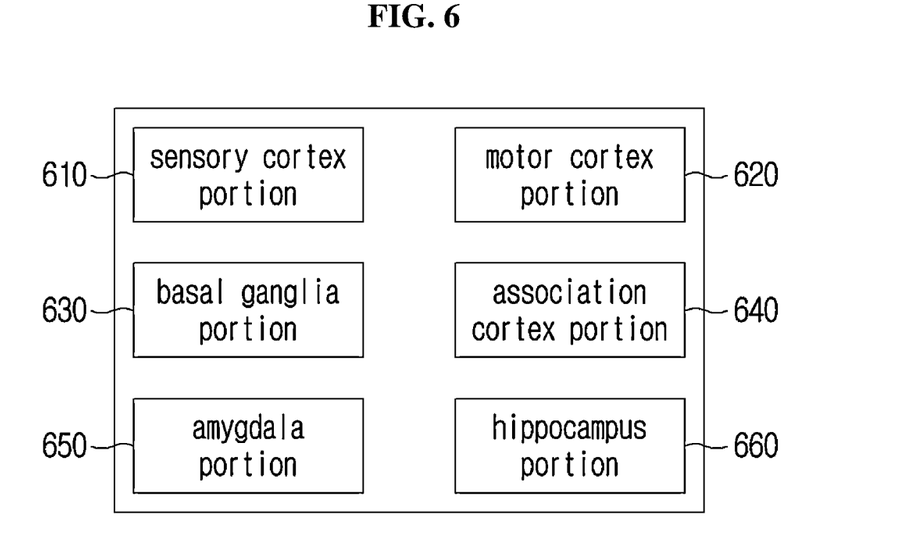
FIG. 6 is a view illustrating a configuration of a thinking device according to an embodiment of the present invention.

FIG. 6 is a view illustrating a configuration of a distributed thinking device according to an embodiment of the present invention.

The thinking device is a device in which the functional elements of FIG. 3 are implemented, and includes a sensory cortex portion 610, a motor cortex portion 620, a basal ganglia portion 630, an association cortex portion 640, and an amygdala portion 650, and a hippocampus portion 660.

According to an embodiment of the present invention, the sensory cortex portion 610, the motor cortex portion 620, the basal ganglia portion 630, the association cortex portion 640, the amygdala portion 650, and the hippocampus 660 may be all included in one device. However, the present invention is not limited thereto.

According to an embodiment of the present invention, each of the sensory cortex portion 610, the motor cortex portion 620, the basal ganglia portion 630, the association cortex portion 640, the amygdala portion 650, and the hippocampus 660 may be implemented as a physical device.

In addition, according to an embodiment of the present invention, the sensory cortex portion 610 and the motor cortex portion 620 may be implemented in one device cluster. The physical implementation is not limited to the above descriptions.

The sensory cortex portion 610 may receive sensing data from the sensor device and preprocess the sensing data.

The motor cortex portion 620 may derive actions on the basis of an input signal including the preprocessed sensing data and transmit a signal for the selected action.

The basal ganglia portion 630 may analyze the actions and, when there are actions beyond the threshold value among the analyzed actions, it is possible to select one of actions above the threshold value.

The association cortex portion 640 may correspond to an artificial association cortex portion that mimics the function of the brain. In particular, the association cortex portion 640 may correspond to an artificial association cortex portion that mimics the function of the association cortex of the human brain.

The association cortex portion 640 may construct a global workspace. Herein, the association cortex portion 640 as an intelligent agent may construct a multi-agent system environment as an intelligent agent.

Herein, the association cortex portion 640 may play the same role as the association cortex included in the human brain. More specifically, the association cortex portion 640 may play the role of the association cortex included in the human brain in a network of a distributed intelligent information system and a distributed intelligent information system itself. According to an embodiment of the present invention, the association cortex portion 640 may serve to combine input data and control prediction, inference, and problem solving.

According to an embodiment of the present invention, when the thinking device operates as the first type device, the association cortex portion 640 of the first type device may make a request for an alternative to an action beyond a threshold value to the workspace. Herein, the association cortex portion 640 may transmit an action alternative request signal for deriving actions beyond a threshold value to the global workspace.

According to an embodiment of the present invention, when the thinking device operates as the second type device, the input signal received by the artificial association cortex portion of the second type device may correspond to the action alternative request signal of the first type device.

According to an embodiment of the present invention, when the thinking device operates as the second type device, the association cortex portion of the second type device may transmit a signal for an action solution to the global workspace.

Figure 7:
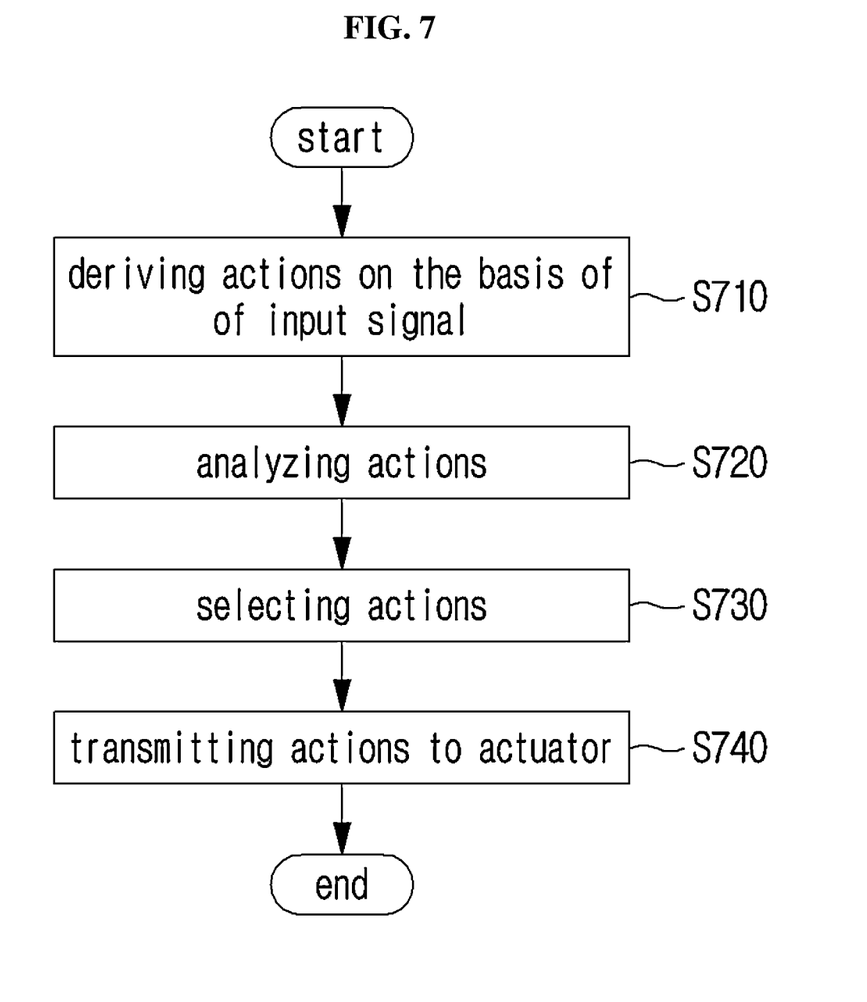
FIG. 7 is a flowchart illustrating a basic operation of a thinking device according to an embodiment of the present invention.

FIG. 7 is a flowchart illustrating a basic operation of a thinking device according to an embodiment of the present invention.

More specifically, FIG. 7 is a view illustrating a basic process that each thinking device generally performs. Each thinking device is referred to as a first type device or a second type device and performs the basic process of FIG. 7.

In a method in which a system intelligently processes information using a distributed thinking device, the thinking device may derive actions on the basis of an input signal (S710).

The thinking device may analyze the actions (S720).

Herein, when the basal ganglia portion of the thinking device analyzes the actions, the priority between the actions may be set.

In addition, according to an embodiment of the present invention, the amygdala portion of the thinking device may perform positive or negative evaluation on the actions using information stored in the thinking device. Herein, the basal ganglia portion may analyze the actions by reflecting the evaluation information of the amygdala portion.

In addition, according to an embodiment of the present invention, the amygdala portion of the thinking device receives and evaluates a signal of an operation result of an actuator, and store information evaluated for the operation result to the thinking device as meta information related to reward.

Thereafter, the thinking device determines whether the action is beyond the threshold value, and when there are actions that are beyond the threshold value among the analyzed actions, the thinking device may select one of the actions that are beyond the threshold value (S730). The device may transmit a signal for the selected action to the actuator (S740).

Herein, when the thinking device determines whether the action is beyond the threshold value, the basal ganglia portion of the thinking device may determine whether there is an action beyond the threshold value among the actions according to priorities of the actions.

The thinking device may operate as a first type device or a second type device.

Herein, when the thinking device operates as the first type device, an action alternative is requested for the global workspace, and a flow in which the first type device operates is described with reference to FIGS. 9 and 10.

In addition, when the thinking device operates as the second type device, an action solution is proposed in the global workspace, and a flow in which the second type device operates is described with reference to FIGS. 11 and 12.

Figure 8:
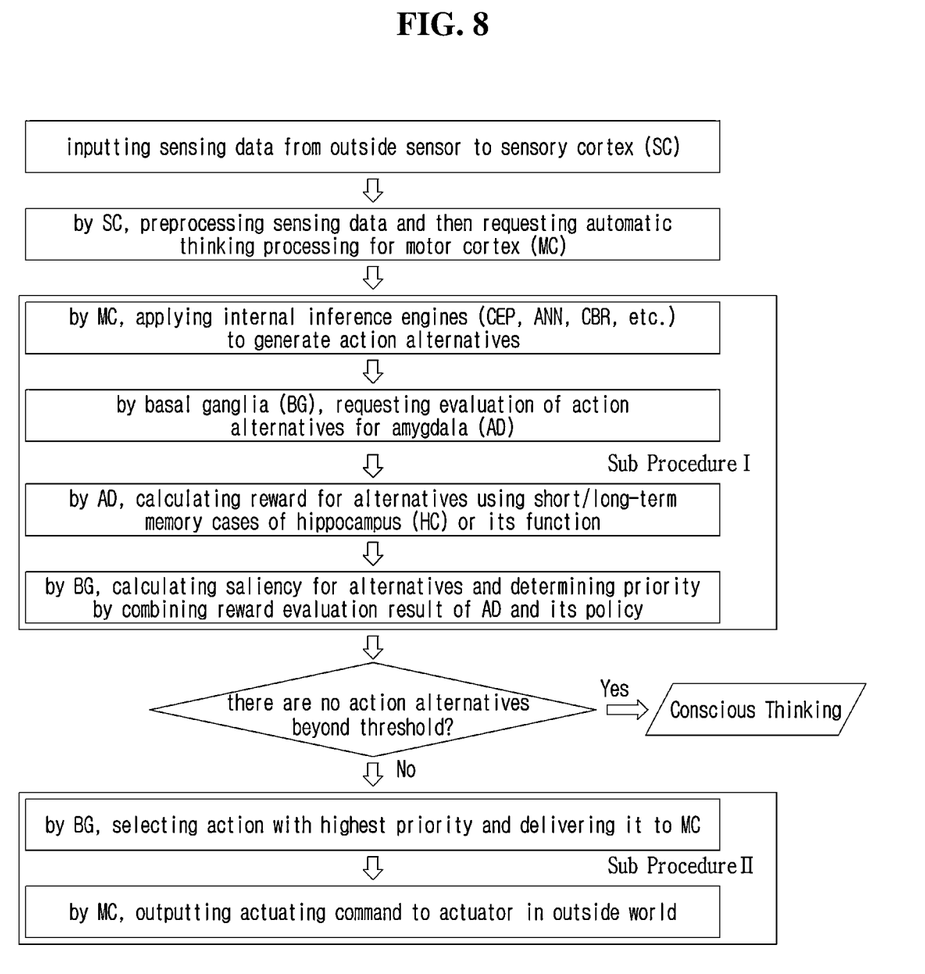
FIG. 8 is a flowchart illustrating processing and interaction in each functional element for "local automatic thinking" at the distributed intelligence node proposed in the present invention.

FIG. 8 is a flowchart illustrating processing and interaction in each functional element for "local automatic thinking" at the distributed intelligence node proposed in the present invention.

According to FIG. 8, when there are no alternatives in which saliency among the actions is beyond the threshold in the basal ganglia (BG) functional element, the problem solving method is changed to a "global conscious thinking" method shown in FIG. 8.

Sub procedures I/II in the flowchart are flows commonly used in global conscious thinking.

The functional elements and intelligent processing methods used for local automatic thinking act as specialists in a specific domain, and the flows may be shared because global conscious thinking must collectively use the problem solving ability of these specialists.

Figure 9:
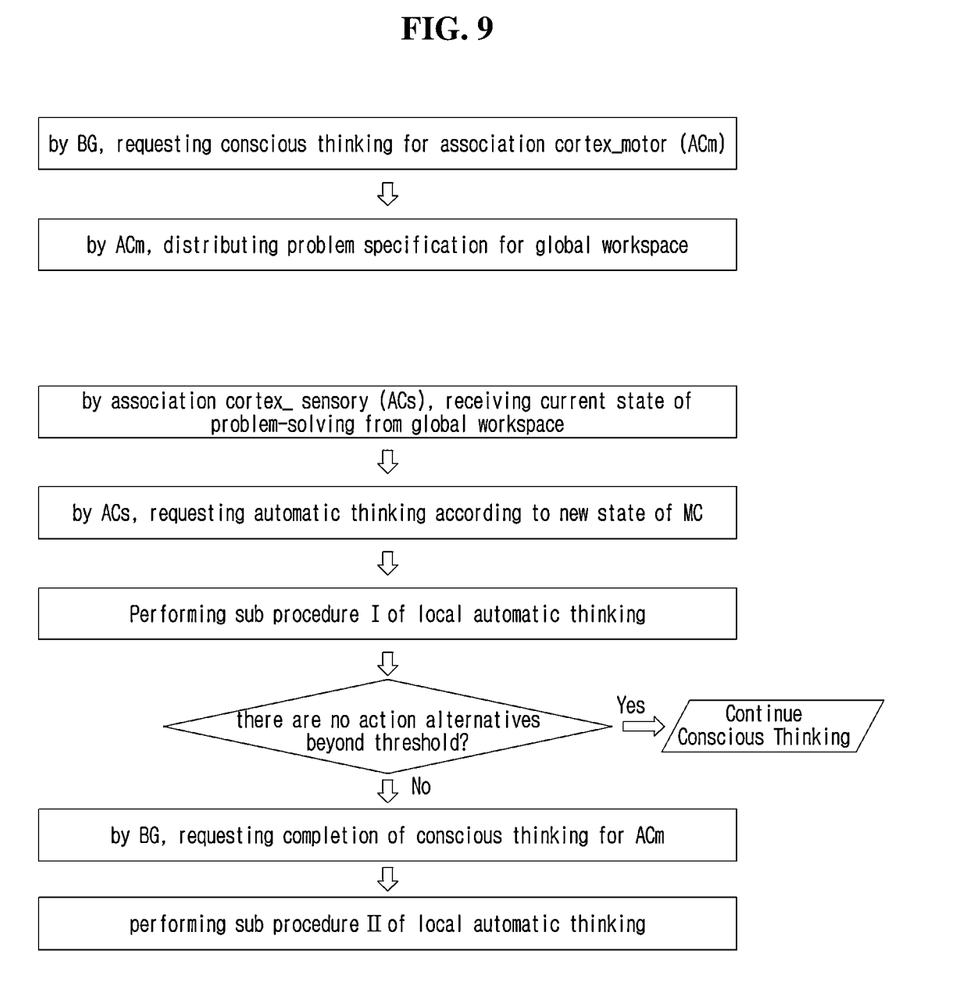
FIG. 9 illustrates a procedure diagram in which a node functions as a requester for global conscious thinking according to an embodiment of the present invention.
Figure 10:
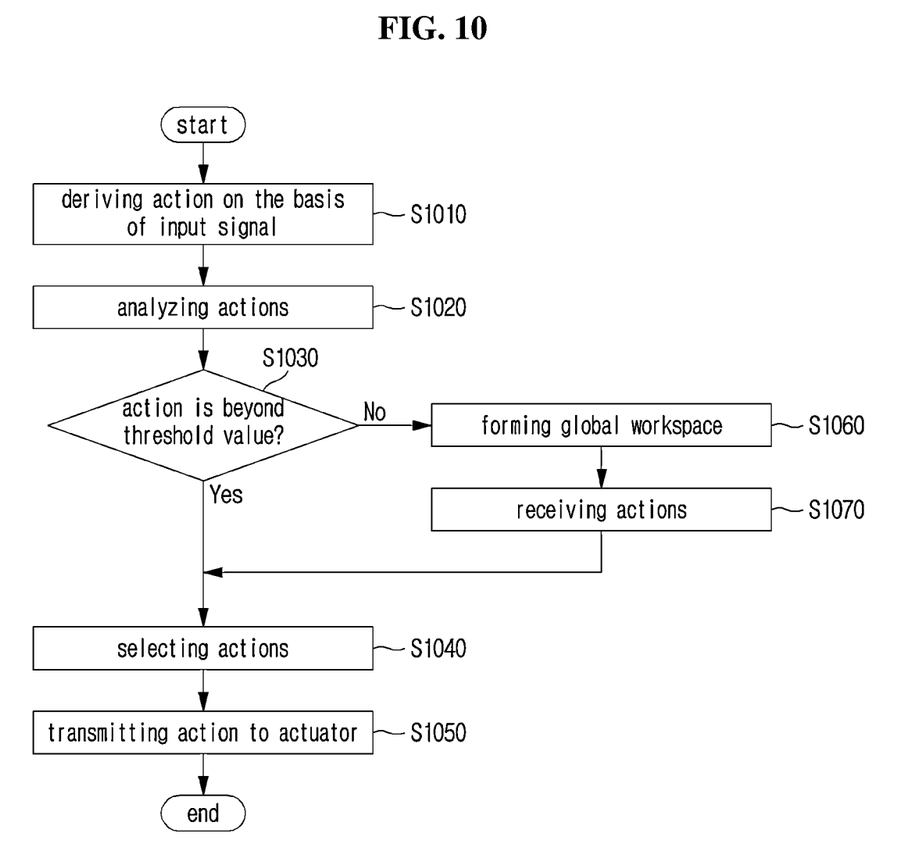
FIG. 10 illustrates a procedure diagram in which a node functions as a requester for global conscious thinking according to an embodiment of the present invention.

FIGS. 9 and 10 illustrate procedure diagrams when a node functions as a requester for global conscious thinking according to an embodiment of the present invention.

FIG. 9 is a flowchart illustrating an execution process in which each thinking device functions as a first type device. In more detail, FIG. 9 shows a flowchart illustrating processing and interaction in the node that requests problem-solving for "global conscious thinking" on the basis of the virtual global workspace constructed as association cortices of the distributed intelligence nodes presented in the present invention.

An upper flow chart shows a step that requests problem solving, and a lower flow chart shows a flow that determines the end of the problem solving. The final decision on whether or not to complete the global problem solving through the GW is made by the requestor for problem solving.

According to FIG. 10, a method in which the system intelligently processes information using a distributed thinking device may be presented, which may correspond to the case where the thinking device operates as the first type device.

The thinking device may first derive actions on the basis of the input signal (S1010).

When the thinking device operates as a first type device, the input signal may correspond to a signal obtained by allowing the sensory cortex portion to receive sensing data from the sensor device and preprocess the sensing data.

The first type device may analyze the actions (S1020). Since the first type device also functions as a thinking device, a method of analyzing the actions follows step S720 described above.

Thereafter, the first type device may determine whether the action is beyond the threshold value (S1030). Herein, the basal ganglia portion of the thinking device determines whether there is an action beyond the threshold value among the actions according to priorities of the actions.

When there are actions that are beyond the threshold value among the analyzed actions, the thinking device may select one of the actions beyond the threshold value (S1040). The thinking device may transmit a signal for the selected action to the actuator (S750).

When none of the analyzed actions is beyond the threshold value, a virtual global workspace (GW) may be constructed.

Herein, the first type device may make a request for an action alternative that is beyond the threshold value to the work area. More specifically, the association cortex portion of the first type device may transmit an action alternative request signal for deriving actions beyond the threshold value to the global workspace.

Figure 11:
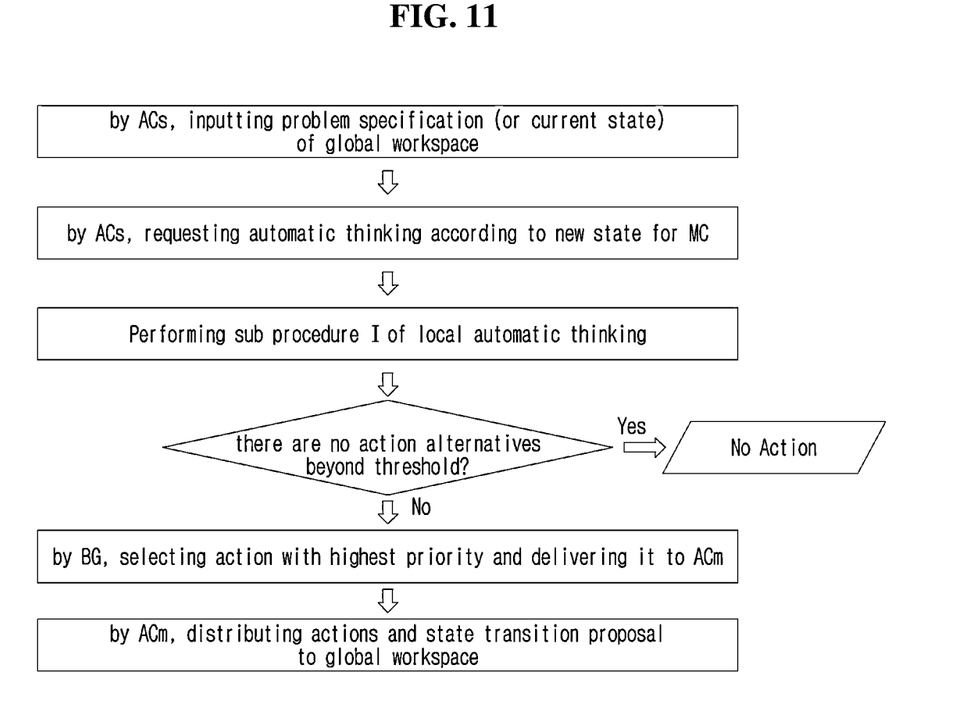
FIG. 11 illustrates a procedure diagram in which a node functions as a proposer of global conscious thinking according to an embodiment of the present invention.
Figure 12:
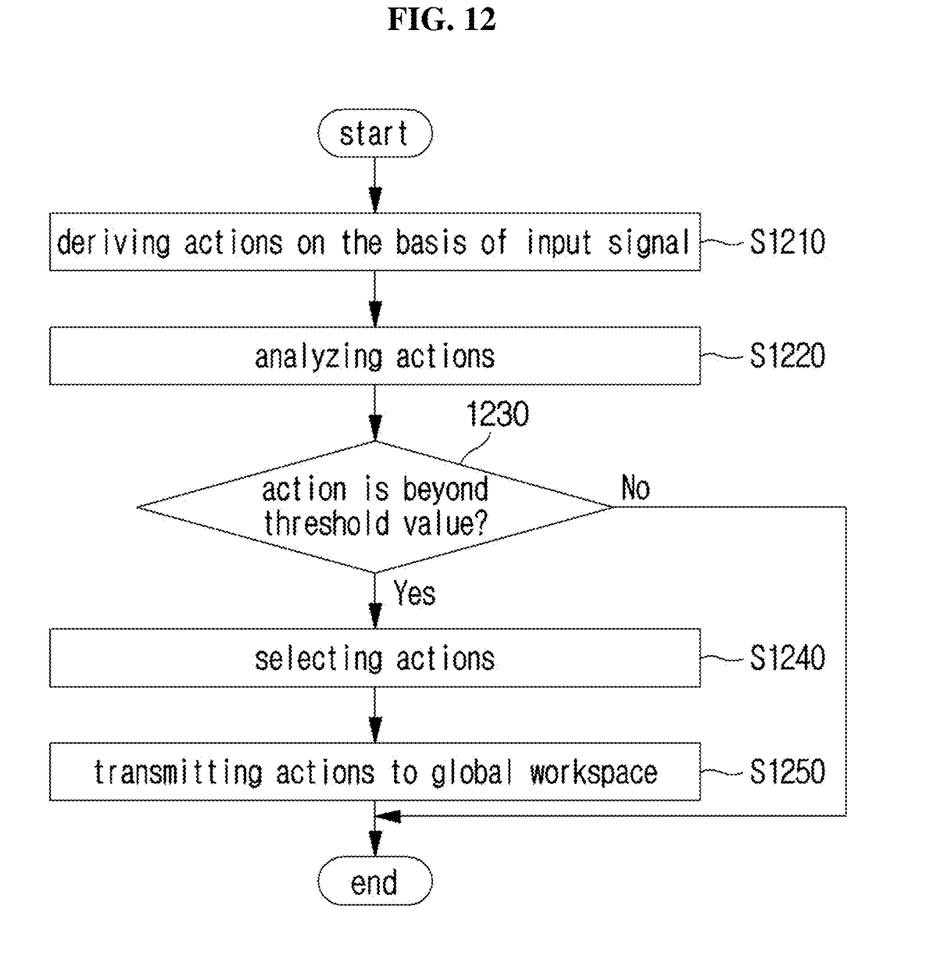
FIG. 12 illustrates a procedure diagram in which a node functions as a proposer of global conscious thinking according to an embodiment of the present invention.

FIGS. 11 and 12 illustrate to procedure diagrams in which a node functions as a proposer of global conscious thinking according to an embodiment of the present invention.

FIG. 12 is a flowchart illustrating an execution process in which each thinking device functions as a second type device. More specifically, FIG. 11 is a flowchart illustrating processing and interaction of a solution proposer for "global conscious thinking" in response to the problem-solving requestor of FIG. 9.

In a specific situation, the requestor may also act as a proposer for the problem solving phase. Each distributed intelligence node may propose a problem-solving action for each state of the GW using the functional elements and processing flow of local automatic thinking. The GW solves the problem using forward reasoning method, and when the competition situation caused by multiple proposals occurs, the GS applies conflict resolution policy to select optimal one. The conflict resolution policy is adapted to ACs in the form of plug-in, thereby providing flexibility.

According to FIG. 12, a method in which the system intelligently processes information using a distributed thinking device may be presented, which may correspond to the case in which the thinking device operates as the second type device. One or more second type devices included in the global workspace may propose an action solution beyond the threshold value to the global workspace.

The thinking device may first derive actions on the basis of the input signal (S1210).

When the thinking device operates as the second type device, the input signal may correspond to a request signal of the first type device received by the association cortex portion.

The second type device may receive the action alternative request signal of the first type device and derive actions based on the request signal (S1210).

The second type device may analyze the actions (S1220). Since the first type device also functions as the thinking device, the method of analyzing the actions may follow step S720 described above.

Thereafter, the second type device may determine whether the action is beyond the threshold value (S1230). Herein, the basal ganglia portion of the thinking device may determine whether there is an action beyond the threshold value among the actions according to priorities of the actions.

When there are actions beyond the threshold value among the analyzed actions, the thinking device may select one of the actions beyond the threshold value as an action solution. Then, the thinking device may transmit a signal for the selected action solution to the global workspace (S1250).

A hyperconnected and distributed intelligent structure that mimics the information processing structure of a brain composed of numerous neurons and synapses is proposed as the hyperconnected and distributed computing environment proposed by the present invention. In this structure, it is possible to solve problems through a problem solving method consisting of local automatic thinking and global conscious thinking.

The present invention may include embodiments that can be implemented in a plurality of ways and processing flows of the functional elements in each method.

What is claimed is:

1. A system for processing distributed intelligent information, the system comprising:
a network node including at least a hardware unit configured to implement a thinking device deriving actions on the basis of an input signal, analyzing the actions, selecting one action when there are actions beyond a threshold value among the analyzed actions, and transmitting a signal for the selected action;
a physical sensor device located in a real external environment and transmitting sensing data to the thinking device; and
a physical actuator receiving the signal for the selected action from the thinking device to operate on the basis of the signal for the action,
wherein, when there are no actions beyond the threshold value among the analyzed actions, a virtual global workspace (GW) is formed, the global workspace including one or more thinking devices, and
the thinking device operates as a first type device or a second type device, in which an action alternative is requested for the global workspace in the case of operating as the first type device, and an action solution is proposed for the global workspace in the case of operating as the second type device.

2. The system of claim 1, wherein the global workspace is composed of an association cortex portion included in the thinking devices, the association cortex portion corresponds to an artificial association cortex portion that mimics a function of an association cortex of human brain, and the association cortex portion constructs a multi agent system environment as an intelligent agent.

3. The system of claim 2, wherein when the thinking device operates as the first type device, the first type device requests the action alternative beyond the threshold value for the global workspace, and when the thinking device operates as the second type device, one or more second type devices included in the global workspace propose the action solution beyond the threshold value for the global workspace.

4. The system of claim 3, wherein the thinking device further includes a basal ganglia portion;

when the association cortex portion of the first type device requests the action alternative beyond the threshold value for the action area, the basal ganglia portion determines whether there are actions beyond the threshold value among the analyzed actions; and when there are no actions beyond the threshold value among the analyzed actions, the association cortex portion transmits an action alternative request signal for deriving actions beyond the threshold value to the global workspace.

5. The system of claim 4, wherein when the thinking device operates as the second type device, the input signal corresponds to the action alternative request signal of the first type device received by the association cortex portion of the second type device.

6. The system of claim 4, wherein the second type device receives the action alternative request signal of the first type device, derives actions on the basis of the action alternative request signal, analyzes the actions, and selects one of the actions beyond the threshold value as the action solution when there are actions beyond the threshold value among the analyzed actions; and the association cortex portion transmits a signal for the action solution to the global workspace.

7. The system of claim 2, wherein the thinking device further includes a sensory cortex portion; and when the thinking device operates as the first type device, the input signal corresponds to a signal obtained by causing the sensory cortex portion to receive sensing data from the sensor device and preprocess the sensing data.

8. The system of claim 2, wherein the thinking device further includes a basal ganglia portion, and sets priorities of the actions when the basal ganglia portion analyzes the actions.

9. The system of claim 8, wherein the basal ganglia portion determines whether there is an action beyond the threshold value among the actions according to the priorities of the actions.

10. The system of claim 8, wherein the thinking device further includes an amygdala portion; and the amygdala portion performs a positive or negative evaluation of the actions using information stored in the thinking device, and the basal ganglia portion reflects the evaluation information and analyzes the actions.

11. The system of claim 8, wherein the thinking device further includes an amygdala portion, and receives a signal for an operation result of the actuator and performs an evaluation thereof so that information evaluated for the operation result is stored in the thinking device as meta information related to reward.

12. The system of claim 2, wherein the association cortex portions of the thinking devices are implemented in one device separated from the thinking devices, and the global workspace is implemented as one physical thinking device.

13. The system of claim 12, wherein the system uses a blackboard mode.

14. The system of claim 2, wherein the global workspace has a hierarchical structure.

15. The system of claim 2, wherein the global workspace is implemented with a publish/subscribe (Pub/Sub) mechanism.

16. A method of intelligently processing information using distributed thinking devices, the method comprising:
   deriving actions on the basis of an input signal;
   analyzing the actions;
   when there are actions beyond a threshold value among the analyzed actions, selecting one of the actions beyond the threshold value; and
   transmitting a signal for the selected action to an actuator,
   wherein when there are no actions beyond the threshold value among the analyzed actions, a virtual global workspace (GW) is formed, the global workspace includes one or more thinking devices, and the thinking device operates as a first type device or a second type device; and
   an action alternative is requested for the global workspace in case of operating as the first type device, and an action solution is proposed for the global workspace in case of operating as the second type device.

17. The method of claim 16, wherein the global workspace is composed of an association cortex portion included in the thinking devices, the association cortex portion corresponds to an artificial association cortex portion that mimics a function of an association cortex of human brain, and the association cortex portion constructs a multi agent system environment as an intelligent agent.

18. The method of claim 17, wherein when the thinking device operates as the first type device, the first type device requests the action alternative beyond the threshold value for the global workspace, and when the thinking device operates as the second type device, the second type devices proposes the action solution beyond the threshold value for the global workspace.

19. A thinking device for processing distributed intelligent information, the device comprising at least a hardware unit configured to implement:
   a sensory cortex portion receiving sensing data from a sensor device and preprocesses the sensing data;
   a motor cortex portion deriving actions on the basis of an input signal including the preprocessed sensing data and transmitting a signal for the derived action;
   a basal ganglia portion for analyzing the actions and, when there are actions beyond a threshold value among the analyzed actions, selecting one of the actions beyond the threshold value; and
   an association cortex portion,
   wherein when there are no actions beyond the threshold value among the analyzed actions, the association cortex portion forms a virtual global workspace (GW) the global workspace including one or more thinking devices; and
   the thinking device operates as a first type device or a second type device, in which an action alternative is requested for the global workspace in the case of operating as the first type device, and an action solution is proposed for the global workspace in the case of operating as the second type device.

20. The thinking device of claim 19, wherein the global workspace is composed of an association cortex portion included in the thinking devices, the association cortex portion corresponds to an artificial association cortex portion that mimics a function of an association cortex of human brain, and the association cortex portion constructs a multi agent system environment as an intelligent agent.

* * * * *